Figure 1:
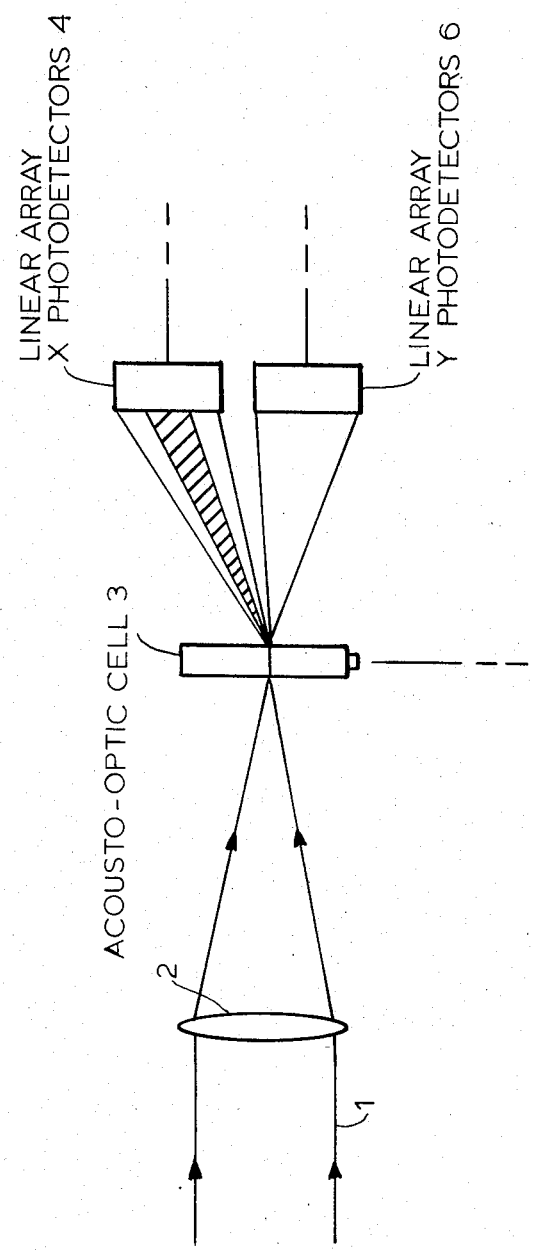

United States Patent [19]

Howell et al.

[11] Patent Number: 4,637,724
[45] Date of Patent: Jan. 20, 1987

[54] SHEARING INTERFEROMETER EMPLOYING AN ACOUSTO-OPTIC CELL

[75] Inventors: Richard H. Howell, Melbourne, Fla.; Alan J. MacGovern, Acton, Mass.

[73] Assignee: Itek Corporation, Lexington, Mass.

[21] Appl. No.: 562,656

[22] Filed: Dec. 19, 1983

[51] Int. Cl.⁴ .............................................. G01B 9/02
[52] U.S. Cl. ...................................... 356/353; 356/354
[58] Field of Search .............. 356/353, 354, 355, 356, 356/363; 350/358; 250/550

[56] References Cited

U.S. PATENT DOCUMENTS

| | | | |
|---|---|---|---|
| 3,958,863 | 5/1976 | Isaacs et al. | 350/358 |
| 4,093,976 | 6/1978 | Das | 350/358 X |
| 4,124,300 | 11/1978 | Mead et al. | 356/355 X |
| 4,474,467 | 10/1984 | Hardy et al. | 356/353 |

OTHER PUBLICATIONS

Ebersole et al. "Collimated Light Acoustooptic Lateral Shearing Interferometer", *Applied Optics*, vol. 13, No. 5, pp. 1004–1005.

*Primary Examiner*—Vincent P. McGraw
*Assistant Examiner*—Matthew W. Koren
*Attorney, Agent, or Firm*—Michael H. Wallach; Robert F. Rotella

[57] ABSTRACT

An improved shearing interferometer is provided having an acousto-optic cell wherein two sets of orthogonal diffraction gratings are formed therein by applying two electrical signals thereto having different frequencies. A wavefront to be examined is passed through the cell, and both signal frequencies applied to the cell are varied to cause the resulting shearing interferogram to be sequentially directed at a pair of orthogonal linear photodetector arrays. The degree of shear may be readily adjusted by changing the difference between the frequencies of the two signals applied to the cell.

16 Claims, 2 Drawing Figures

SHEARING INTERFEROMETER EMPLOYING AN ACOUSTO-OPTIC CELL

BACKGROUND OF THE INVENTION

The present invention relates to the field of shearing interferometers for measuring the relative phase shifts at points in the wavefront which are indicative of wavefront distortion.

In U.S. Pat. No. 3,829,219 to Wyant, a shearing interferometer is described having first and second diffraction gratings having slightly different spatial frequencies (e.g., 290 and 310 lines/mm) for producing angularly displaced beams having a region of overlap within which a lateral shearing interferogram is produced, which is a measure of wavefront distortion. Such a device is useful for either direct visual observation of the shearing interferogram or may be employed in connection with electronic phase measurement arrangements for indicating and correcting wavefront distortion. In this patent a pair of ruled diffraction gratings are translated mechanically, transverse to the direction of light propogation.

In U.S. Pat. No. 3,923,400 to Hardy, a shearing interferometer system is disclosed which, like the aforesaid patent, includes a similar two-frequency grating positioned near the focal plane of the wavefront to be examined. The translation of the two-frequency grating also produces modulation of the interference pattern. As in the arrangement of Wyant, the diffraction gratings are slightly different in spatial frequency which causes the production of two diffracted cones of light at two slightly different angles, which however, have a common region of overlap. The result is the formation of a shearing interferogram in the region of overlap, and the measurement of the fringe spacing between fringes within the overlap will reveal or measure the departure of the wavefront from its ideal shape.

Unlike the first mentioned patent to Wyant, the Hardy patent teaches the use of two sets of two diffraction gratings, each set formed at right angles with respect to the other, on a single piece of photographic film. The film is moved in a direction of 45° relative to the orientation of the four diffraction gratings on the film which in turn causes modulation of the sheared interferograms, allowing the techniques of electronic A.C. detection to be applied. The orthogonal grating patterns cause shearing in x and y in order to measure wavefront distortion in the two dimensional domain.

In both of these patents, incorporated by reference herein, the gratings are photographically recorded on film or the like, and are moved by means of a drive system such as a moving loudspeaker coil transducer.

It is an object of the present invention to provide a new and improved shearing interferometer for examining wavefront distortion.

It is a further object of the invention to produce a shearing interferometer whereby the diffraction grating spatial frequencies may be electronically changed with great ease and rapidity to provide changing light deflection to in turn provide sequential scanning of the entire wavefront under examination in both x and y directions, to measure wavefront aberrations. Two linear arrays of photodetectors may be employed, perpendicular to each other, rather than employing an x-y array which requires many more detectors. For example 10 detectors could be positioned in one dimension in x, and 10 in y rather than the 200 detectors required by two 10×10 rectangular arrays.

It is also an object of the invention to readily change the amount of shear between the two diffracted cones of light merely by electronically changing the frequency of one control signal relative to another which changes the difference between the spatial frequencies of the two gratings.

It is yet a further object of the invention to provide a system for measuring wavefront aberrations in both x and y without the use of an additional beam splitter and focusing lens.

It is yet a further object of the invention to eliminate the prior art fixed frequency film gratings together with the drive mechanisms therefor.

SUMMARY OF THE INVENTION

In accordance with a preferred embodiment of the invention, the wavefront to be measured is focused upon a relatively thin acousto-optic cell having two electro-acoustic transducers affixed to orthogonal sides of the cell, each being driven by electrical signals having a frequency F and F+delta F, which in turn produce travelling acoustic waves within the body of the fluid, causing the incident light to be angularly diffracted as it passes through the cell. Since there are two sets of waves set up in the cell travelling in orthogonal directions, a first pair of diffracted cones of light will overlap and be projected upon a first linear photodetector array, and a second pair of diffracted cones of light will overlap and be directed at a second linear detector array. Thus within the overlap regions, beat frequencies will be produced in the x and y detector outputs, the phase of such beat signal being proportional to the degree of local wavefront tilt or distortion of light passing through the cell. The frequencies of the two signals F and F+delta F applied to both transducers, are continuously changed to in turn produce a continuous change in the angle of diffraction of the light passing through the cell, thereby to cause the overlap portions of the light cones to sweep along the linear photodetector arrays. As a result of this action, mapping of the wavefront under examination is accomplished in both the x and y directions. Also, the amount of the previously mentioned shear is readily controlled by changing the frequency of the F signal.

Figure 2:
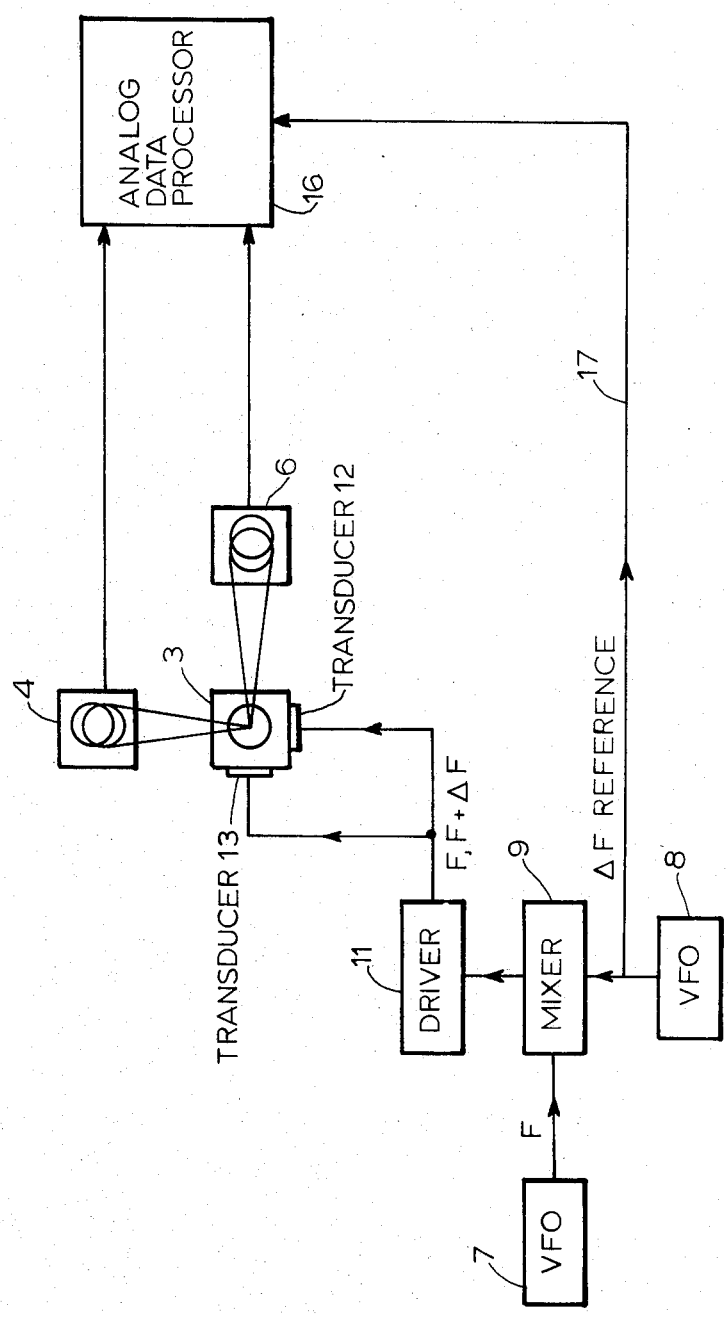

Other objects, features and advantages of the present invention will become apparent upon studying the following specification, taken in conjunction with the teachings of the above-mentioned patents and:

FIG. 1 which illustrates the positioning of the cell between the focusing lens and the x and y detectors; and FIG. 2 which illustrates the arrangement of the preferred embodiment.

SPECIFIC DESCRIPTION

Referring now to FIG. 1, the wavefront of light to be measured 1, is focused by lens 2 at acousto-optic cell 3 which is positioned between lens 2 and linear photodetector arrays 4 and 6, as indicated. Linear arrays 4 and 6 are also schematically illustrated in FIG. 2, and receive light passing through cell 3 which is projected upon a first planar face of the cell by lens 2. Variable frequency oscillator (VFO) 7 produces a signal having a frequency F which is mixed with a signal produced by oscillator 8, which generates a reference signal having a frequency of delta F. Signals F and delta F are mixed by mixer 9 and are applied to driver amplifier 11, which in turn is coupled to electro-acoustic transducers 12 and 13 affixed to orthogonal sides of cell 3. AC signal F applied to transducer 12 produces a travelling wave within the acousto-optic cell which has a frequency corresponding to the frequency F and a second travelling wave is produced in the same direction by virtue of the application of the F plus delta F signal to transducer 12. The mechanical wave energy is absorbed at the opposite side of the cell facing the side bearing transducer 12, so that no standing waves are generated. As a result, light diffraction gratings having spatial frequencies F and F+delta F are produced within the body of the cell similar to the two spatial frequency grating 18 illustrated in FIGS. 1 and 2 of the above-mentioned Wyant patent. The first order diffracted light beams are preferably detected, rather than other orders and the region of overlap between them produces the lateral shearing interferogram, for the purposes previously explained. In like manner the application of sinusoidal electrical signals F having a frequency of F, and F plus delta F, to transducer 13 causes a second pair or set of diffraction gratings of slightly different spatial frequency to be generated within the cell which cross the first pair of gratings generated by transucer 12, at right angles thereto. Thus the application of the described electrical signals to driver 11, produce two pairs of overlapping cones of light for measuring wavefront distortion in both X and Y.

As the frequency of the signal produced by VFO 7 increases, (the frequency of the delta F signal remaining fixed), light passing through cell 3 will be diffracted to a greater angular extent in X and Y so that the overlapping cone portions are directed sequentially along the linear photodetectors. The resulting A.C. outputs of each linear array are applied to analog-data processor 16 which measures the phase shift of the A.C. components generated by the detectors with respect to the delta F reference signal, which is also applied to data processor 16 via lead 17. The greater the shift in phase of the A.C. output signal with respect to the reference signal delta F the greater the indicated tilt or wavefront aberration. The operation of analog-data processor 16 forms no part of the present invention and reference may be made to the above-mentioned patents for further details, which details have been eliminated in the interest of brevity and economy in explaining the nature of this particular improved shearing interferometer.

The orthogonal sets of travelling waves within the cell cause the diffracted orders of light to be effectively Doppler shifted, and a beat frequency delta F is observed in the overlap region, which region scans along each linear array as F and F plus delta F increases in frequency, thereby to scan the wavefront under examination in the X and Y direction. Since the phase of the resulting beat signal is proportional to the local wavefront tilts, the degree of phase shifting of the A.C. signals produced by the linear arrays may be employed to map the input wavefront phase aberration as is known in the art.

Thus the spatial frequency of the gratings may be continuously changed electronically to repetitively sweep the diffracted cones of light across the linear arrays simply by applying a linear chirp to the frequency F signal generated by VFO 7. Furthermore the amount of shear may be readily adjusted merely by changing the frequency of the delta F oscillator 8.

The employment of both X and Y transducers operating in conjunction with a single cell avoids beam splitting along with auxiliary optics, which may produce optical aberrations. An important feature to be noted is the elimination of mechanical drivers for the fixed frequency gratings of the prior art, through the use of an acousto-optic cell for diffracting light. While it may be feasible to employ surface acoustic waves in a reflective mode, greater variation of output signal will occur in the transmissive mode, where light is transmitted through the cell. Since the orthogonal acoustic waves do not interfere with one another, a single cell may be employed to eliminate auxiliary optics as mentioned above. The acousto-optic cells could comprise a solid or fluid light transmissive body.

While particular embodiments of the present invention have been shown and described, it is apparent that various changes and modifications may be made, and it is therefore intended that the following claims cover all such modifications and changes as may fall within the true spirit and scope of this invention.

We claim:

1. In a lateral shearing interferometer having a distorted wavefront incident thereon, for determining relative phase differences between different areas of said distorted wavefront, and for generating signals indicative of said phase differences, and having first and second diffraction gratings, each of which has a slightly different grating frequency, for shearing the wavefront, the improvement comprising:
   a. an acousto-optic cell for producing diffraction grating forming travelling acoustic waves therein in response to vibrational forces applied thereto;
   b. electro-mechanical transducer means for producing first and second travelling acoustic waves within said cell;
   c. electrical signal generator means for applying electrical signals having frequencies of F and F+delta F to said transducer means for producing said waves forming said first and second diffracting grating within said cell, said signal generator means being operable to change the frequency of said signals F and F+delta F through a given frequency range which changes the degree of angular displacement of a given order of diffracted light transmitted through said cell;
   d. means for directing said wavefront at said cell; and
   e. means for measuring the sheared wavefronts of a given order of light diffracted by said cell.

2. The combination as set forth in claims 1 further including means for changing the difference in frequency between the electrical signals F and delta F, thereby to change the amount of shear between the overlapping beams.

3. In a lateral shearing interferometer having a distorted wavefront incident thereon, for determining relative phase differences between different areas of said distorted wavefront, and for generating signals indicative of said phase differences, and having first and second diffraction gratings, each of which has a slightly different grating frequency, for shearing the wavefront in a first direction together with third and fourth diffraction gratings, each of which has a slightly different grating frequency, for shearing the wavefront in a second direction, the improvement comprising:
   a. an acousto-optic cell for producing diffraction grating forming travelling acoustic waves therein in response to vibrational forces applied thereto;
   b. electro-mechanical transducer means for producing first and second travelling acoustic waves within said cell moving transversely with respect to each other;

c. electrical signal generator means for applying electrical signals having frequencies of F and F+delta F to said transducer means for producing said waves forming said first, second, third and fourth diffracting grating within said cell;

d. means for directing said wavefront at said cell; and e. means for measuring the sheared wavefronts of a given order of light diffracted by said cell.

4. The combination as set forth in claim 3 wherein said signal generator means changes the frequency of said signals F and F+delta F through a given frequency range which changes the degree of angular displacement of a given order of diffracted light transmitted through said cell.

5. The combination as set forth in claims 3 or 4 further including means for changing the difference in frequency between the electrical signals F and delta F, thereby to change the amount of shear between the overlapping beams.

6. In a lateral shearing interferometer having a distorted wavefront incident thereon, for determining relative phase differences between different areas of said distorted wavefront, and for generating signals indicative of said phase differences, and having first and second diffraction gratings, each of which has a slightly different grating frequency, for shearing the wavefront in a first direction together with third and fourth diffraction gratings, each of which has a slightly different grating frequency, for shearing the wavefront in a second direction, the improvement comprising:

a. an acousto-optic cell for producing diffraction grating forming travelling acoustic waves therein in response to vibrational forces applied thereto;

b. transducer means mechanically coupled to said cell for producing first and second travelling acoustic waves therein, moving transversely with respect to each other in first and second directions;

c. electrical signal generator means for applying electrical signals having frequencies of F and F+delta F to said transducer means for producing said waves forming said first, second, third and fourth diffracting grating within said cell;

d. means for directing said wavefront at said cell; and e. first and second linear photodetector arrays positioned substantially parallel to said first and second directions respectively, for measuring the sheared wavefronts of a given order of light diffracted by said cell.

7. The combination as set forth in claim 6 wherein said signal generator means changes the frequency of said signals F and F+delta F through a given frequency range which changes the degree of angular displacement of a given order of diffracted light transmitted through said cell.

8. The combination as set forth in claims 6 or 7 further including means for changing the difference in frequency between the electrical signals F and delta F, thereby to change the amount of shear between the overlapping beams.

9. In a lateral shearing interferometer having a distorted wavefront incident thereon, for determining relative phase differences between different areas of said distorted wavefront, and for generating signals indicative of said phase differences, and having first and second diffraction gratings, each of which has a slightly different grating frequency, for shearing the wavefront in a first direction together with third and fourth diffraction gratings, each of which has a slightly different grating frequency, for shearing the wavefront in a second direction, the improvement comprising:

a. an acousto-optic cell for producing diffraction grating forming travelling acoustic waves therein in response to vibrational forces applied thereto;

b. first and second electro-mechanical transducer means mechanically coupled to said cell for producing first and second travelling acoustic waves within the body of said cell moving transversely with respect to each other;

c. electrical signal generator means for applying electrical signals having frequencies of F and F+delta F to said first and second transducer means for producing said waves forming said first, second, third and fourth diffracting grating within said cell;

d. means for directing said wavefront at said cell; and e. first and second linear photodetector arrays for measuring the sheared wavefronts of a given order of light diffracted by said cell.

10. The combination as set forth in claim 9 wherein said signal generator means changes the frequency of said signals F and F+delta F through a given frequency range which changes the degree of angular displacement of a given order of diffracted light transmitted through said cell.

11. The combination as set forth in claims 9 and 10 further including means for changing the difference in frequency between the electrical signals F and delta F, thereby to change the amount of shear between the overlapping beams.

12. In a lateral shearing interferometer having a distorted wavefront incident thereon, for determining relative phase differences between different areas of said distorted wavefront, and for generating signals indicative of said phase differences, and having first and second diffraction gratings, each of which has a slightly different grating frequency, for shearing the wavefront in a first direction together with third and fourth diffraction gratings, each of which has a slightly different grating frequency, for shearing the wavefront in a second direction, the improvement comprising:

a. an acousto-optic cell for producing diffraction grating forming travelling acoustic waves therein in response to vibrational forces applied thereto;

b. first and second electro-mechanical transducer means mechanically coupled to said cell for producing first and second travelling acoustic waves within the body of said cell moving in first and second directions perpendicular to each other;

c. electrical signal generator means for applying electrical signals having frequencies of F and F+delta F simultaneously to said first and second transducer means for producing said waves forming said first, second, third and fourth diffracting grating within said cell;

d. means for focusing said wavefront in the vicinity of a first planar surface of said cell, said surface being generally parallel to the direction of motion of said travelling waves; and e. first and second linear photodetector arrays facing a second planar surface of said cell, opposite said first planar surface, and oriented in a direction substantially parallel with said first and second direction of motion of said waves, respectively, for measuring the sheared wavefronts of a given order of light diffracted by said cell.

13. The combination as set forth in claim 12 wherein said signal generator means changes the frequency of said signals F and F+delta F through a given frequency range which changes the degree of angular displacement of a given order of diffracted light transmitted through said cell.

14. The combination as set forth in claims 12 and 13 further including means for changing the difference in frequency between the electrical signals F and delta F, thereby to change the amount of shear between the overlapping beams.

15. The combination as set forth in claims 1, 3, 4, 6, 7, 9, 10, 12, or 13 wherein said cell comprises a thin Raman Nath cell.

16. The combination as set forth in claims 1, 3, 4, 6, 7, 9, 10, 12, or 13 wherein said means for directing said wavefront focuses said wavefront upon said cell.

* * * * *